United States Patent Office 3,525,634
Patented Aug. 25, 1970

3,525,634
METHOD FOR TREATING FIBROUS SUBSTRATES
Vincent Theodore Elkind, Metuchen, and Robert Tweedy Hunter, Piscataway, N.J., assignors to Colgate-Palmolive Company, New York, N.Y., a corporation of Delaware
No Drawing. Filed Nov. 28, 1967, Ser. No. 686,292
Int. Cl. B44d 1/44
U.S. Cl. 117—63                                    6 Claims

ABSTRACT OF THE DISCLOSURE

This invention relates to a method and means for achieving a degree of oil and/or water repellency by fibrous materials by treating such materials as textiles and the like with a fluorocarbon polymer and achieving the desired oil and/or water repellency by activation with a solvent, such as unsymmetrical trichlorotrifluoroethane.

---

It is known that textile materials can be made water resistant and oil repellent by treating them with aqueous solutions or dispersions of organic compounds which contain a plurality of perfluoroalkyl radicals. After such treatment, in the past, it has been necessary to activate the oil and water resistant attributes by curing techniques such as oven or hot iron treatments. It will be appreciated that oven techniques cannot readily be utilized in conjunction with textile materials in the home. While ironing techniques on the other hand, may be easily utilized in the home, the ironing of pile type material or even already applied fibrous wall paper is virtually impossible. A technique avoiding the prior art cure methods would be appreciated as giving wider usage to the use of fluorocarbon polymer compounds in establishing a degree of water and oil repellency for various materials.

Accordingly, it is contemplated that the present invention relates to a method for developing oil and water repellency in fibrous materials, such as textile materials, comprising treating such materials with a fluorocarbon polymer in water, for instance; then drying said treated materials; thereafter treating the materials with an activation compound to achieve the water and oil repellency benefits of the fluorocarbon polymer.

The fluorochemical compounds, which are used to impart water and oil repellent properties, can have chemical structures that vary widely. For example, acrylates and methacrylate of hydroxyl compounds containing a highly fluorinated residue and their polymers and copolymers can be used. Fluorochemical compounds of this type are defined with greater particularity in U.S. Pats. Nos. 2,642,416, 2,826,564, 2,829,513, and 2,803,615. Other fluorochemical compounds which can be employed as oil and water repellent agents include the chromium coordination complexes of saturated perfluoromonocarboxylic acids of which the chromium complexes of perfluorobutyric acid and perfluorooctanoic acid are representative. Fluorochemical compounds suitable for the process of the invention are available commercially for example, those marketed under the trade name of "Scotchgard" by the Minnesota Mining and Manufacturing Company.

The preferred fluoro compounds are the perfluoropolymers, particularly the acrylates and methacrylates, in emulsion form.

Of outstanding performance are copolymers, terpolymers and interpolymers containing the aforementioned fluoro-compounds in combination with other co-polymerizable monomers such as:

vinyl esters of organic and inorganic acids, e.g.,
    vinyl chloride
    vinyl bromide
    vinyl fluoride
    vinyl acetate
vinyl propionate
vinyl stearate
vinyl benzoate
vinyl ethers, e.g.,
    methyl vinyl ether
    ethyl vinyl ether
    N-butyl vinyl ether
    decyl vinyl ether
    octadecyl vinyl ether
    benzyl vinyl ether
    phenyl vinyl ether
    divinyl ether
alkyl vinyl ketones (alkyl of $C_1$ to $C_{30}$)
alkyl acrylates (alkyl of $C_1$ to $C_{30}$)
alkyl methacrylates (alkyl of $C_1$ to $C_{30}$)
vinylidene halides
acrylic acid
acrylonitrile
acrylamide
N-methylol acrylamide
N-methoxymethyl acrylamide
styrene
alkyl styrenes Suitable compounds by way of example include the following generic classes:

(A)      $X_1(C(X)_2)_n(CH_2)_m$—OH (B)      $X_1(C(X)_2)_n(CH_2)_m$—OR (C)      $X_1(C(X)_2)_n(CH_2)_m$—COOH (D)      $X_1(C(X)_2)_n(CH_2)_m$—O$\overset{R^1}{\underset{}{C}}$CH$_2$ (E)      $X_1(C(X)_2)_n(CH_2)_m$—SO$_2$NR$^3$O$\overset{R^4}{\underset{}{C}}$CCH$_2$ wherein:

X is hydrogen, chlorine or fluorine, X is hydrogen, lower alkyl ($C_1$–$C_4$) or halogen and at least 70% thereof are fluorine R is alkyl ($C_1$ to $C_{30}$); allyl; chloroallyl; phenyl; substituted phenyl; cycloalkyl; and aralkyl; ketero (e.g., thrinyl, pyrryl, pyridyl, pyrimidyl, furyl, imidozolyl, oxazolyl, pyrazolyl, etc.);

$R^1$ and $R^4$ are hydrogen, lower alkyl, chlorine or fluorine;
$R^2$ is hydrogen or alkyl ($C_1$ to $C_{30}$);
$R^3$ is alkylene of $C_1$ to $C_{20}$;
N=3 to 30 and M=0 to 3

Specific examples of compounds are:

1H,1H-perfluorohexyl acrylate
1H,1H-perfluorohexanoic acid
1H,1H-perfluorohexyl methacrylate
1H,1H-perfluorooctyl acrylate
1H,1H-perfluorododecyl acrylate
1H,1H-perfluorododecyl methacrylate
1H,1H-perfluorododecyl-fluoroacrylate
1H,1H-perfluorodecyl ethacrylate
1H,1H,7H-perfluoroheptyl acrylate
1H,1H,7H-perfluoroheptyl methacrylate
1H,1H,11H-perfluoroundecyl methacrylate
1H,1H,3H-perfluorooctyl methacrylate
1H,1H,2H,2H-perfluorooctyl acrylate
1H,1H,3H-perfluorooctyl acrylate
1H,1H,2H,2H-perfluorooctyl methacrylate
1H,1H,5H,5H-perfluorooctyl acrylate
1H,1H,2H,2H-perfluorononyl methacrylate
1H,1H,2H,2H,9H-perfluorononyl methacrylate
1H,1H-perfluoroctanol
1H,1H-perfluorododecanol
1H,1H,2H,2H-perfluorododecanol
1H,1H-perfluorododecanoic acid
allyl 1H,1H-perfluorooctanoate
β-chloroallyl 1H,1H,10H-perfluorodecanoate
phenyl 1H,1H-perfluoroheptanoate
p-chlorophenyl 1H,1H-perfluorodecanoate
cyclohexyl 1H,1H,2H,2H-perfluorodecanoate
2-furyl 1H,1H,2H,2H-perfluorodecanoate
3-thienyl 1H,1H,2H,2H-perfluorodecanoate
benzyl 1H,1H-perfluorodedecanoate

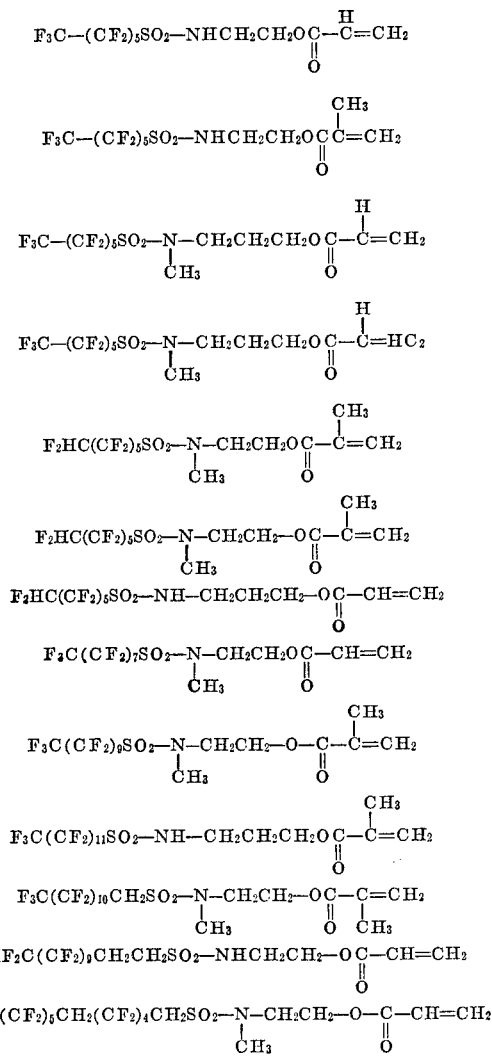

1,3-butadiene
mono- and di-acrylate esters of alkanediols
mono- and di-vinyl esters of alkanedioic acids,
and the like Specific copolymers, terpolymers, and interpolymers of particularly outstanding characteristics include the following monomers (on a weight basis):

(I)

(a) 90% 1H,1H,2H,2H perfluorooctyl methacrylate
(b) 10% n-butyl acrylate (II)

(a) 95% 1H,1H,2H,2H perfluorooctyl methacrylate
(b) 5% n-butyl acrylate (III)

(a) 97.5% 1H,1H,2H,2H perfluorooctyl methacrylate
(b) 2.0% n-butyl acrylate
(c) 0.5% n-methylol acrylamide (IV)

(a) 48.8% 1H,1H,2H,2H perfluorooctyl methacrylate
   32.5% 1H,1H,2H,2H perfluorodecyl methacrylate
   16.2% 1H,1H,2H,2H perfluorododecyl methacrylate
(b) 2% n-butyl acrylate
(c) 0.5% n-methylol acrylamide.

The applicable activation compound may be one or more of the following: unsymmetrical trichlorotrifluoroethane (Freon 113), 1,3,hexafluorooxylene, trifluorotoluene and tetrahydrofuran, The techniques attendant the present invention may be utilized in conjunction with fibrous, porous and continuous surfaces. Illustrative articles to be treated are textiles, glass, paper, wood, leather, fur, asbestos, bricks, concrete, metals, ceramics, plastics, painted surfaces and plaster. Due to the advantages incident to the repellency to oil and water and their resistance to soiling imparted by carrying out the techniques of the present invention; the preferred classes of articles to be treated are textile apparel, upholstery, draperies, carpeting, paper bags, cardboard containers, luggage, handbags, shoes, jackets, redwood, pine cedar and asbestos siding materials, bricks, concrete, floor or wall tiles painted or unpainted metals such as appliances and automobile bodies, masonry, wood, plaster wallpaper and wallboard surfaces. In the treatment of fabrics, 0.05 to 5% (preferably 0.1 to 1%) by weight of the fluorocarbon polymer on the weight of the fabric produces desirable surface properties. Illustrative textiles which can be advantageously treated with the fluorocarbon polymer are those based on natural fibers, e.g., cotton, wool, mohair, linen, jute, silk, ramie, sisal, kenaf, etc., and those based on synthetic fibers, e.g. rayon, acetate, acrylic, polyester, saran, azylon, nytril, nylon, spandex, vinyl, olefin, vinyon and glass fibers. (These designations of synthetic fibers are the generic terms set up by the Federal Trade Commission.) The treatment of these fabrics with the compositions of this invention imparts no adverse effect on the hand of the fabric and in some cases has a softening effect, thereby improving the hand.

The fluorocarbon polymer may be applied as a surface treatment by known methods of coating such as spraying, brushing or impregnation from an aqueous or organic solvent dispersion or an organic solution of the fluorocarbon polymer. The fluorocarbon polymer may be used as the sole component in the treating vehicle or as a component in a complex multi-ingredient formulation. For instance, excellent water and oil repellency and soil resistance is obtained on textile fabrics which are treated simultaneously with the fluorocarbon polymer and conventional finishes, such as mildew preventatives, moth resisting agents, crease resistant resins, lubricants, softeners, sizes, flame retardants, anti-static agents, dye fixatives, and other water repellents. In the treatment of paper the fluorocarbon polymer may be present as an ingredient in a wax, starch, casein, elastomer or wet strength resin formulation. By mixing the fluorocarbon polymer in an aqueous or oil type paint formulation it may be applied effectively to unpainted or previously painted asbestos siding, wood, metal and masonry. In the treatment of floors and tile surfaces and like substrates and fluorocarbon polymer may be applied by incorporating it in a wax based emulsion or solution.

In addition to oil and water repellency and said resistance properties, the fluorocarbon polymer may be used to impart lower surface adhesion values and lower coefficients of friction to substrates. Accordingly, they may also be used as mold release agents and related applications.

The amount of the fluorocarbon polymer used in the impregnating solution may be varied within wide limits, depending on the type of substrate employed and on the end use requirements for water repellency, oil repellency and durability. The following ranges are preferred, and give excellent results on many types of substrates, such as fabrics:

(a) 1% to 5% of an aqueous dispersion of the fluorocarbon polymer compound (about 30% active ingredient).

(b) Surfactant may vary from 0–6%.

(c) Small but effective amount to wetness of the selective curing solvent.

The percentages are given on the weight of the substrate treated when it is a fabric. The actual percentage deposited on the fabric in the course of treatment can be calculated from the percent concentration of each material in the treating solution and the percent wet pick-up of the fabric. After impregnation, with the dispersion, the textile of Example 2, given below, is passed through squeeze rolls of a padder or other similar device and then dried.

The following specific examples will further illustrate the practice of the invention, but are not to be deemed to limit the scope of the invention to any procedural or other details there set forth.

EXAMPLE 1

Cotton swatches are treated in an aqueous medium containing polyperfluorooctyl methacrylate (as an emulsion) and surfactant namely, N-hydrogenated tallow N,N-diisopropanol N-methyl methyl sulfate. The quantity of the polyperfluorooctyl methacrylate in the aqueous medium is such so as to deposit 0.25% by weight of the weight of fabric and similarly, the surfactant is used in a quantity of 0.33% by weight of the fabric.

After exhausting the fluorocarbon polymer on the swatches, the swatches are removed from the treating medium and air dried at room temperature. The thereby treated specimens have a fair water repellency.

Some of the swatches are then brushed with Freon 113 (unsymmetrical trichlorotrifluoroethane). These swatches are then dried at room temperature. The so brushed swatches develop good repellency and support a considerable weight of water. Drops of N-tetradecane oil bead on the fabric for ten seconds before sinking. This corresponds to a Du Pont Oleophobic rating of 5.

After laundering twice with a commercial detergent, the oil and water repellency of the swatches drop to zero. The repellencies are partially restored by once again treating with Freon 113, that is, to an Oleophobic rating of 2.

It will be appreciated that the technique of this example may be accomplished by adding the fluorocarbon polymer mixture to the rinse cycle in a conventional home washing type of machine followed by conventional drying in a home clothes dryer. In order to cure the finish, a sponge loaded with the selective curing solvent is tumbled with the clothes at the end of the drying period, so that the clothes will absorb the solvent vapor to develop the latent properties. On the other hand, the finish can be developed by sealing a quantity of the selective curing solvent in a chamber with clothes; the chamber can be simply a polyethylene bag.

EXAMPLE 2

This example illustrates the further concept of treating fabrics in a mill with the fluorocarbon polymer followed by drying and activation in an atmosphere of the selective solvent. Illustratively, rolls of cotton are run through a padder where the cotton is treated to an 80% wet pick-up of a formulation comprising 3.5% by weight of a polymer latex (30% solids), said polymer derived from a monomer of the formula:

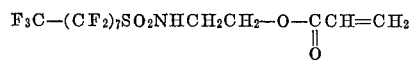

and 0.35% nonyl phenoxypolyoxyethylene ethanol nonionic surfactant, the remainder being water. The roll of wet cotton then is passed through an oven at 250° F. where it is dried for five minutes. The cotton is then cooled to room temperature. Thereafter, the cotton is conveyed to a sealed chamber where it is exposed to vapor of Freon 113. From the chamber, the roll of cotton is passed into a sealed compartment, where the vapor of the selective solvent is efficiently recovered. The cotton so treated exhibits a high degree of water and oil repellency.

EXAMPLE 3

Example 1 is repeated using the following in polymer form:

(A) 1H,1H,7H-perfluoroheptyl acrylate
(B) 1H,1H,7H-perfluoroheptyl methacrylate
(C) 1H,1H,11H-perfluoroundecyl methacrylate
(D) 1H,1H,11H-perfluoroundecyl acrylate Excellent results are obtained.

Several tests can be employed to establish the effectiveness of the present process for imparting water repellent and oil repellent properties to the various substrates.

For water repellency (a) AATCC spray test, Test Method 22–1952, Manual of the American Association of Textile Chemists and Colorists (AATCC), 1959 edition, p. 164.

(b) Water penetration test, Federal Specification CCC–T–191, Modification POD–112, p. 3.

For oil repellency

Minnesota Mining and Manufacturing Scotchgard technical bulletin, Appendix A.

Accepted standards of performance for treated fabrics by the test methods listed above are:

For water repellency (a) Spray test—80 or higher.
(b) Water penetration—60 minutes or longer.

For oil repellency

Oil repellency ratings of 80 or higher.

The test results obtained on the swatches treated as described in Example 1 are as follows:

| Treatment | Water repellency spray rating | Water penetration time | Oil repellency spray rating |
|---|---|---|---|
| None (control) | 0 | 0 (immediate) | 0 |
| As in Ex. 1 | 100 | Over 100 min | 100 |

EXAMPLE 4

Example 2 is repeated using the polymers derived from the following compounds:

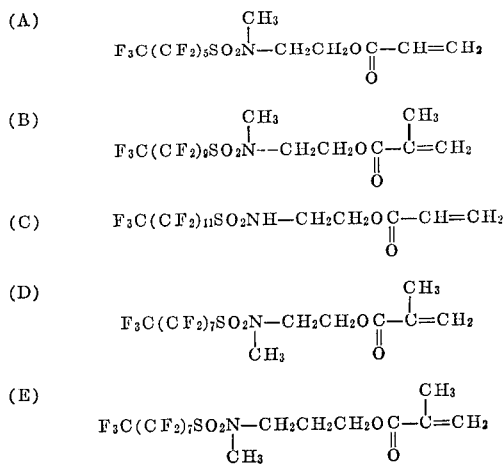

(A) $F_3C(CF_2)_5SO_2N(CH_3)-CH_2CH_2OC(O)-CH=CH_2$ (B) $F_3C(CF_2)_6SO_2N(CH_3)-CH_2CH_2OC(O)-C(CH_3)=CH_2$ (C) $F_3C(CF_2)_{11}SO_2NH-CH_2CH_2OC(O)-CH=CH_2$ (D) $F_3C(CF_2)_7SO_2N(CH_3)-CH_2CH_2OC(O)-C(CH_3)=CH_2$ (E) $F_3C(CF_2)_7SO_2N(CH_3)-CH_2CH_2CH_2OC(O)-C(CH_3)=CH_2$

The results are comparable to Example 2.

EXAMPLE 5

In previously known techniques for exhausting the fluorocarbon polymer onto textiles, substantial quantities of either quaternary or non-ionic emulsifiers are necessary to insure oil and water repellency after heat application. The instant example is illustrative of the special unexpected results obtainable when no emulsifiers are employed in the deposition step.

A fluorocarbon polymer which is a terpolymer of:

(A) 97.5% 1H,1H,2H,2H-tridecafluorooctyl methacrylate
(B) 2% N-butyl acrylate
(C) 0.5% N-methylol acrylamide in latex form and containing 0.5% by weight polymer solids based on the weight of the fabric is agitated for 10 minutes at room temperature with 60 grams of cotton swatches in 1200 ml. of water; the swatches are hand extracted and air dried.

Some of the swatches are ironed 176 seconds per square foot at 350° F. without developing water or oil repellency. Other swatches are oven cured for seven minutes at 300° F. These swatches do not develop oil or water repellency.

A third batch of swatches is soaked and dried with unsymmetrical trichlorotrifluoroethene. These swatches develop considerable repellency to heavy Nujol oil and even to relatively light N-tetradecane oil. The swatches also possess a degree of water repellency having an AATCC spray rating of 50.

EXAMPLE 6

Example 5 is repeated using the following (in polymerized and in latex form):

(A)

97% monomer A of Example 5
2% monomer B of Example 5
1% dodecyl mercaptan (B)

95% 1H,1H-nonodecafluorodecyl methacrylate
5% N-butyl acrylate (C)

98% 1H,1H,9H-hexadecafluorononyl acrylate
2% 2-ethyl hexyl acrylate

Excellent oil and water repellencies are obtained.

EXAMPLE 7

Example 1 is repeated and as in that example some of the treated and air dried swatches are (a) brushed with the Freon and others are (b) ironed at 350° F. for 1 minute. These are compared with (c) untreated and laundered swatches for stain repellent characteristics against common household staining materials.

While a number of tests have been devised to determine the degree of stain resistance of fabrics and the subsequent launderability thereof, many of the tests fail by reason of the difficulty of making such tests consistently reproducible. Colgate-Palmolive research scientists have developed an ingenious test system which overcomes the shortcomings of the previous tests. Essentially, their method consists of placing onto the fabric measured volumes of standard common staining materials and comparing the size and intensity to a visual standard. In this way a semi-quantitative estimation of the staining characteristics of a given fabric is obtained.

The test technique employs three water borne stains, namely, (1) chocolate milk, (2) black coffee and (3) imitation "Coke," and three oil borne stains, namely, (4) blue dyed corn oil, (5) French dressing and (6) blue dyed petroleum oil.

The staining materials mentioned in the above have the following compositions:

(1) Chocolate milk stain

| | Cc. |
|---|---|
| Evaporated milk | 80 |
| Corn syrup | 20 |
| Chocolate syrup | 20 |
| Water | 60 |

This stain should be prepared once a week and kept refrigerated.

(2) Black coffee

| | G. |
|---|---|
| Instant coffee | 1.5 |
| Boiling water | 95.5 |

The coffee solution is allowed to cool until it reaches 70–80° F. The stain should not be kept for more than eight hours. The coffee stain should be freshly prepared on a daily basis.

(3) Imitation "Coke"

| | Cc. |
|---|---|
| "Coke" syrup | 50 |
| Isopropanol | 50 |
| Water | 100 |

(4) Blue dyed corn oil 0.40 g. blue dye is added to 400 g. corn oil with stirring and heat in order to obtain a uniform solution.

(5) French dressing

Once a bottle is opened, it should be stored in a refrigerator.

(6) Blue dyed petroleum oil 250 grams of oil are mixed with 0.1% blue dye by weight of the oil. The mixture is agitated and warmed in order to obtain a uniform solution.

The test in the instant case is a static stain repellent test in that the fabric surface is given a minimum disturbance.

In application the temperature of the stain materials is between 70–80° F. A piece of white fabric approximately 7 inches by 7 inches is placed on blotting paper on a hard surface. 1½ cc. of each test stain is carefully placed (not dropped) in separate areas on the fabric. After two minutes, the excess stain material, if any, is removed using a vacuum suction line without coming in physical contact with the stained surface. The stained area is brushed twice lightly in opposite directions with a straight motion of a dry absorbent tissue to remove any unabsorbed stain material.

The stains are rated against the white background of a clean blotter. Ratings of 1 through 5 are arrived at strictly on size (relative spread) of an individual stain while rating 6 through 10 determines relative wetting as measured by intensity of the stain against a standard.

In other words, a stain not even wetting the fabric could not change the color of the fabric and would have been completely removed from the surface thereof. The rating, therefore, would be 10. With increasing wetting of the area to which the stain has been applied there would be a greater color intensity therefore a lower rating until 6 is reached, whereupon, if the stain has migrated from its original boundary then one can assume complete wetting of the original area so that degree of migration becomes the determining factor. The greater the migration, the lower the number given. It will be appreciated that the test system is based on relative values and yet provides unique reproducible valid results.

The three water borne stains are added together to give a possible maximum of 30. Likewise the oil borne stains are added to give a maximum possibility of 30. These may then be totalled for a maximum of 60.

To arrive at the launderability portion of the test, the stained fabrics are dried 24 hours. Laundering is then carried out by washing in an automatic washer with a quantity of a conventional detergent. The fabrics are then dried in an automatic dryer at the appropriate setting for the fabric type. They are then lightly dry ironed (stain side down) at the appropriate fabric setting.

The rating of launderability of stains is based on the same 1–10 system used for the static stain repellency tests. Again, it will be noted that the maximum rating after adding the results of the water borne stains will be 30, and similarly 30 will be the total results regarding the oil borne stains. These two may be added together.

By rating both the initial static stain repellency and the launderability, a complete picture can be obtained not possible when only the initial stain reaction is determined.

|     | Repellency | | | Launderability | | |
| --- | --- | --- | --- | --- | --- | --- |
|     | W.B.[1] | O.B.[2] | Total | W.B. | O.B. | Total |
| (a) | 21 | 18 | 39 | 27.5 | 13 | 40.5 |
| (b) | 23.5 | 21 | 44.5 | 29 | 13.5 | 42.5 |
| (c) | 3 | 6 | 9 | 3 | 6 | 9 |

[1] Water-borne strains.
[2] Oil-borne strains.

Thus, the subject method is shown to be at least as effective as extensive ironing in developing the stain repellency of the treated fabric.

It will be apparent that many changes and modifications of the several features described herein may be made without departing from the spirit and scope of the invention. It is therefore apparent that the foregoing description is by way of illustration ot the invention rather than limitation of the invention.

What is claimed is:

1. In a method for developing oil and water repellency in connection with fibrous substrates which have been treated with a fluorocarbon acrylate or methacrylate polymer, applied to said substrates from an aqueous dispersion and subsequently dried, the improvement which comprises treating the treated substrate with a fluid which is a solvent for said fluorocarbon polymer and selected from the group consisting of unsymmetrical trichlorotrifluoroethane, 1,3 bis hexafluoroxylene, trifluorotoluene and tetrahydrofuran.

2. The method of claim 1 wherein the fluorocarbon polymer is polyperfluorooctyl methacrylate.

3. The method of claim 1 wherein the polymer is a terpolymer of tridecafluorooctyl methacrylate, butyl acrylate and methylol acrylamide.

4. The method of claim 1 wherein the solvent is applied as a vapor.

5. The method of claim 4 wherein the substrates are textile materials and the solvent is applied as a vapor.

6. The method of claim 5 wherein the solvent is unsymmetrical trichlorotrifluoroethane.

References Cited

UNITED STATES PATENTS 2,277,941  3/1942  Almy _____ 36—77
2,642,416  6/1953  Ahlbrecht et al. _____ 260—83.5
2,803,615  8/1957  Ahlbrecht et al. _____ 260—29.6

WILLIAM D. MARTIN, Primary Examiner

T. G. DAVIS, Assistant Examiner

U.S. Cl. X.R.

117—135.5, 161